(12) United States Patent
Simon

(10) Patent No.: US 11,100,624 B2
(45) Date of Patent: Aug. 24, 2021

(54) METHOD AND DEVICE FOR ANALYZING IMAGE SECTIONS FOR A CORRESPONDENCE CALCULATION

(71) Applicant: Robert Bosch GmbH, Stuttgart (DE)

(72) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 16/631,694

(22) PCT Filed: Jun. 11, 2018

(86) PCT No.: PCT/EP2018/065317
§ 371 (c)(1),
(2) Date: Jan. 16, 2020

(87) PCT Pub. No.: WO2019/015877
PCT Pub. Date: Jan. 24, 2019

(65) Prior Publication Data
US 2020/0151864 A1    May 14, 2020

(30) Foreign Application Priority Data
Jul. 19, 2017   (DE) ...................... 10 2017 212 339.7

(51) Int. Cl.
*G06T 7/00* (2017.01)
*G06T 7/10* (2017.01)

(52) U.S. Cl.
CPC .............. *G06T 7/0002* (2013.01); *G06T 7/10* (2017.01); *G06T 2207/10012* (2013.01)

(58) Field of Classification Search
CPC ... G06T 7/0002; G06T 7/10; G06T 7/55–596; G06T 3/0068–0081; G06T 2270/10012
See application file for complete search history.

(56) References Cited

U.S. PATENT DOCUMENTS 9,330,340 B1 * 5/2016 Diverdi ................. G06T 7/0002
9,646,385 B2 * 5/2017 Domanski ................. G06T 3/40
(Continued)

FOREIGN PATENT DOCUMENTS

EP      2275990 B1    9/2012
JP      H08280026 A   10/1996
(Continued)

OTHER PUBLICATIONS

International Search Report dated Aug. 2, 2018 of the corresponding International Applicated PCT/EP2018/065317 filed Jun. 11, 2018.
(Continued)

*Primary Examiner* — Sean T Motsinger
(74) *Attorney, Agent, or Firm* — Norton Rose Fulbright US LLP; Gerard Messina

(57) ABSTRACT

In a method and apparatus for evaluating image segments for a correspondence calculation, an image signal is received from an image sensor and is evaluated in order to determine the extent to which, for a selected region of the image sensor, noise caused by the image sensor is present; and a resultant evaluation parameter, for an image segment of an image acquired by the image sensor, which describes whether the image segment is suitable for a correspondence calculation, is ascertained. The image segment corresponding to the selected region of the image sensor and the resultant evaluation parameter are ascertained based on the determined extent of the noise.

11 Claims, 4 Drawing Sheets

(56) References Cited

U.S. PATENT DOCUMENTS

| | | | |
|---|---|---|---|
| 2005/0089246 A1* | 4/2005 | Luo | G06K 9/00268 382/286 |
| 2006/0233442 A1* | 10/2006 | Lu | G06K 9/036 382/190 |
| 2006/0257050 A1* | 11/2006 | Obrador | G06T 7/0002 382/286 |
| 2008/0080762 A1* | 4/2008 | Kawakami | G06T 7/593 382/154 |
| 2010/0277774 A1* | 11/2010 | Reid | G06T 7/0002 358/474 |
| 2011/0019096 A1* | 1/2011 | Lee | H04N 9/646 348/607 |
| 2014/0029836 A1* | 1/2014 | Keselman | H04N 13/139 382/154 |
| 2014/0293004 A1* | 10/2014 | Tsubaki | H04N 5/2224 348/43 |
| 2015/0170351 A1* | 6/2015 | Kobayashi | G06T 7/00 382/165 |
| 2015/0269735 A1* | 9/2015 | Tateno | G06K 9/4609 382/153 |
| 2016/0078584 A1* | 3/2016 | Song | G06T 1/005 382/100 |
| 2016/0180541 A1* | 6/2016 | Romanenko | G06K 9/0051 382/103 |
| 2017/0140203 A1* | 5/2017 | Naito | G06K 9/4642 |
| 2017/0154415 A1* | 6/2017 | Aydin | H04N 19/85 |
| 2019/0251684 A1* | 8/2019 | Ko | G06T 3/0093 |
| 2020/0151864 A1* | 5/2020 | Simon | H04N 5/2173 |
| 2020/0250806 A1* | 8/2020 | Kuwahara | G06T 7/60 |

FOREIGN PATENT DOCUMENTS

| | | |
|---|---|---|
| JP | 2009104366 A | 5/2009 |
| JP | 2015162156 A | 9/2015 |
| WO | 2008/087104 A1 | 7/2008 |

OTHER PUBLICATIONS

Bonato V et al: "A Parallel Hardware Architecture for Scale and Rotation Invariant Feature Detection," IEEE Transactions on Circuits and Systems for Video Technology, Institute of Electrical and Electronics Engineers, USA, vol. 18, No. 12, Dec. 1, 2008, pp. 1703-1712.

-H Irene Yu-Hua et al: "Multiresolution Feature Detection Using a Family of Isotropic Bandpass Filters," IEEE Transactions on Systems, Man and Cybernetics, Part B: Cybernetics, IEEE Service Center, Piscataway, NJ, US, vol. 32, No. 4, Aug. 1, 2002.

* cited by examiner

METHOD AND DEVICE FOR ANALYZING IMAGE SECTIONS FOR A CORRESPONDENCE CALCULATION

CROSS-REFERENCE TO RELATED APPLICATIONS

The present application is the national stage of International Pat. App. No. PCT/EP2018/065317 filed Jun. 11, 2018, and claims priority under 35 U.S.C. § 119 to DE 10 2017 212 339.7, filed in the Federal Republic of Germany on Jul. 19, 2017, the content of each of which are incorporated herein by reference in their entireties.

FIELD OF THE INVENTION

The present invention relates to a method and an apparatus for evaluating image segments for a correspondence calculation.

BACKGROUND

The topic of correspondence calculation is encountered in the field of computer vision, especially in the context of optical flow and stereo disparity. In the context of optical flow (OF), correspondences are calculated in a time direction by determining associations between coordinates in a first image and coordinates in a second image. A correspondence of this kind then indicates how the projection of a point in the 3D scene into the 2D image has moved on from an old coordinate to a new coordinate. The motion in the image can be brought about by motion of the scene point or by motion of the camera, or by both at once. In the context of stereo vision, the two images are captured approximately simultaneously by two cameras that are located at different points. The relative disposition of the cameras as a rule is fixed and known.

Stereo camera systems are known, for example, from EP 2275990 B1 and WO 2008/087104 A1.

Correspondence calculation makes it possible, for example, to track a relative motion over time or to determine the distance to the point in the 3D scene by triangulation.

In methods of the existing art, little to no attention is devoted to the noise present in the image signal. In weakly textured image regions, for example in the region of the sky, on the street, on smooth building fronts, or in shadow regions, a scene texture that is present is often insufficient to prevail over unavoidable noise present in the image sensor's signal. Because of the unfavorable signal to noise ratio (SNR), it can be difficult or impossible to determine correspondences in these image regions.

Many of the recognized methods for correspondence calculation therefore use regularization measures, in particular involving the addition of smoothness assumptions. The background here is the observation that an image scene is made up substantially of surface elements within which the desired (dense) field of correspondences (optical flow field or stereo disparity field) has a substantially smooth profile, i.e., varies predominantly slowly and steadily from one image point to another.

It is thus possible (and common practice) to give preference, in image regions having weak texture, to a smooth "interpolation" rather than a true measurement in which textures are matched from one image to another. This transition is usually continuous; with a good texture, the influence of the matching (i.e., true measurement in the image data) predominates; with a weak texture, interpolation predominates. This procedure does in fact predominantly yield correct results, in particular if the aforementioned assumptions are met and the acquired image scenes have favorable properties. The results can also, however, be grossly incorrect.

These approaches are therefore not suitable in particular for safety-critical functions (e.g., camera-based driver assistance), which should not produce incorrect results even in difficult environmental conditions.

SUMMARY OF THE INVENTION

A method according to the present invention for evaluating image segments for a correspondence calculation encompasses: receiving an image signal from an image sensor; evaluating the image signal in order to determine the extent to which, for a selected region of the image sensor, noise caused by the image sensor is present; and ascertaining a resultant evaluation parameter, for an image segment of an image acquired by the image sensor, which describes whether the image segment is suitable for a correspondence calculation; the image segment corresponding to the selected region of the image sensor, and the resultant evaluation parameter being ascertained based on the determined extent of the noise.

An apparatus according to the present invention for evaluating image segments for a correspondence calculation encompasses: an input section that is configured to receive an image signal from an image sensor; and an evaluation section that is configured to evaluate the image signal in order to determine the extent to which, for a selected region of the image sensor, noise caused by the image sensor is present, and to ascertain a resultant evaluation parameter, for an image segment of an image acquired by the image sensor, which describes whether the image segment is suitable for a correspondence calculation; the image segment corresponding to the selected region of the image sensor, and the resultant evaluation parameter being ascertained based on the determined extent of the noise.

A "correspondence calculation" is to be understood to mean that mutually corresponding features are ascertained in two individual images, the individual images preferably having been acquired in a chronological sequence or having been acquired approximately simultaneously from several camera positions.

The image signal is received from an image sensor. This means that the apparatus according to the present invention preferably encompasses an interface for an image sensor, or else itself encompasses the image sensor. Reception of the image sensor also, however, permits buffering of the image signal. For example, the image signal can be recorded and can be furnished to the apparatus according to the present invention by way of a memory medium. The image signal can also be received from the image sensor by way of a transfer technology, for example via radio transfer.

The selected region of the image sensor is any region of an active surface of the image sensor. The selected region is, in particular, limited to a few image points, also called "pixels," of the image sensor. An image segment that corresponds to the selected region of the image sensor is one such region of an image, acquired by the image sensor, whose image points have been acquired by the individual sensors located in the selected region of the image sensor.

The extent of the noise is, in particular, a value that describes a signal to noise ratio. The evaluation parameter is a parameter that is furnished according to the present invention. The evaluation parameter can be used by a subsequent image processing function, by way of which in particular the correspondence calculation itself is performed, to take certain image segments of an image into account in the correspondence calculation if indicated by the evaluation parameter, and not to take certain image segments of an image into account in the correspondence calculation if indicated by the evaluation parameter.

The apparatus according to the present invention is suitable for executing the method according to the present invention. The method according to the present invention furnishes a method for making the influence of unavoidable sensor noise controllable in the context of a correspondence method. On the one hand the method is very efficient because, for example, there is very little outlay in terms of calculation, storage, and transfer; and on the other hand the method is based very closely on an existing signal processing chain and is thus particularly effective.

The present invention makes it possible in particular to distinguish those regions of an image in which the impression of an existing surface structure and/or texture can be produced by noise of the image sensor from those regions in which a surface structure and/or texture that is suitable for a correspondence calculation does actually exist.

According to the present invention, an influence of noise is modeled in the context of correspondence calculation, and the risk of incorrect correspondences due to a poor signal to noise ratio is greatly reduced. In particular, for each pixel of an image a binary information item, i.e., an additional bit, is ascertained, providing information as to whether the feature that is associated with that pixel (and, for example, describes the local environment around the pixel) is suitable for use for the correspondence calculation. That suitability depends, in particular, on the local texture and on the noise.

According to the present invention, an evaluation of the image signal is performed in order to determine the extent to which, for a selected region of the image sensor, noise caused by the image sensor is present. This means that noise caused by the selected region of the image sensor is ascertained in the image signal. The extent is described in particular by an SNR value.

According to the present invention, a resultant evaluation parameter is ascertained for an image segment of an image acquired by the image sensor, which parameter describes whether the image segment is suitable for a correspondence calculation; the image segment corresponding to the selected region of the image sensor, and the resultant evaluation parameter being ascertained based on the determined extent of the noise. This means that a resultant evaluation parameter is preferably ascertained and furnished for each image segment of the image furnished by the image sensor by way of the image signal.

The resultant evaluation parameter is preferably furnished in combination with a pertinent proportion of the image signal by way of which a feature, pertinent to the image segment, of the image acquired by the image sensor is defined.

The method according to the present invention preferably furthermore encompasses execution of a correspondence calculation, the only image regions being utilized for a correspondence calculation being those with which a resultant evaluation parameter that describes the fact that the respective image region is suitable for a correspondence calculation is associated.

For the selected region of the image sensor, preferably a proportional extent of the noise in different signal paths is determined, and the resultant evaluation parameter for the image segment is determined based on the respective proportional extent of the noise from all signal paths. The extent of the noise is thus determined by ascertaining individual portions of the extent of the noise in different signal paths. The result is to create a broader and thus more reliable basis for reliably ascertaining the resultant evaluation parameter. In particular, for each signal path an image signal value is ascertained which describes the extent of the noise caused by the image sensor. The signal paths are preferably mutually parallel signal paths, the signal paths being brought together at their ends in order to ascertain the resultant evaluation parameter.

Also preferably, the image signal is filtered differently in each of the different signal paths in order to determine the respective proportional extent of the noise. It thereby becomes possible to take into account, for the evaluation of the image segment, only specific portions of the image signal which are particularly relevant for the correspondence calculation.

It is also advantageous if different frequency regions of the image signal are respectively pertinent to each proportional extent of the noise. Each proportional extent of the noise is pertinent, in this context, to one signal path. In particular, a noise is thus determined for different frequency regions of the image signal in order to determine the proportional extent of the noise in the signal paths. This makes possible a particularly good distinction between portions of the image signal which are caused by noise and those portions of the image signal which are caused by the imaging of an actual surface in the image.

It is furthermore advantageous if a preliminary evaluation parameter is ascertained from each proportional extent of the noise, and if the preliminary evaluation parameters are merged to yield the resultant evaluation parameter. A single resultant evaluation parameter is thus generated, from several preliminary evaluation parameters, for each image segment. It is thus possible, in particular, to reproduce information for different frequency regions of the image signal by way of the single resultant evaluation parameter. In particular, a weighting of the preliminary evaluation parameters occurs in this context. It is thereby possible to generate, from several signal paths, a single resultant evaluation parameter that can easily be furnished for a correspondence calculation.

It is likewise advantageous if a dynamic compression is applied to the image signal before evaluation of the image signal is accomplished. Dynamic compression is also referred to as "tone mapping." By applying dynamic compression, it is possible to minimize an influence of different grayscale values in the image signal on the extent of the noise, and thus on the resultant evaluation parameter. Dynamic compression is applied to the entire image acquired by the image sensor.

It is furthermore advantageous if the resultant evaluation parameter is a binary value, indicates a degree of suitability for correspondence calculation in several steps, or is a vector value. Such values are easy to furnish and can easily be further processed. Thanks to the limited absolute number of possible values, it is possible to define the manner in which a corresponding image segment is to be handled in the context of the correspondence calculation.

It is also advantageous if the evaluation of the image signal in order to determine an extent of the noise is accomplished for several selected regions of the image sensor in order to ascertain several resultant evaluation parameters. Different features in an image, and their suitability for correspondence calculation, can be described by way of such a plurality of resultant evaluation parameters.

Preferably, an evaluation parameter is ascertained for each image point of the image acquired by the image sensor, based on the noise extent existing there.

It is furthermore advantageous if a stabilization function is applied to one of the resultant evaluation parameters that is pertinent to a first image segment, a positional and/or time-related filtering being accomplished based on adjacent resultant evaluation parameters. A stabilization function is thus applied to one of the resultant evaluation parameters that is pertinent to a first image segment, an adaptation of a value of the resultant evaluation parameter of the first image segment to a resultant evaluation parameter of an image segment adjacent to the first image region being performed. The information basis underlying a resultant evaluation parameter can thus be broadened, and its reliability thus enhanced. The result is to exploit, for example, the fact that typically, regions in an image that are suitable for correspondence calculation are disposed next to one another, and regions that are less suitable for correspondence calculation are likewise disposed next to one another.

Example embodiments of the invention will be described in detail below with reference to the accompanying drawings, in which.

DETAILED DESCRIPTION

Figure 1:
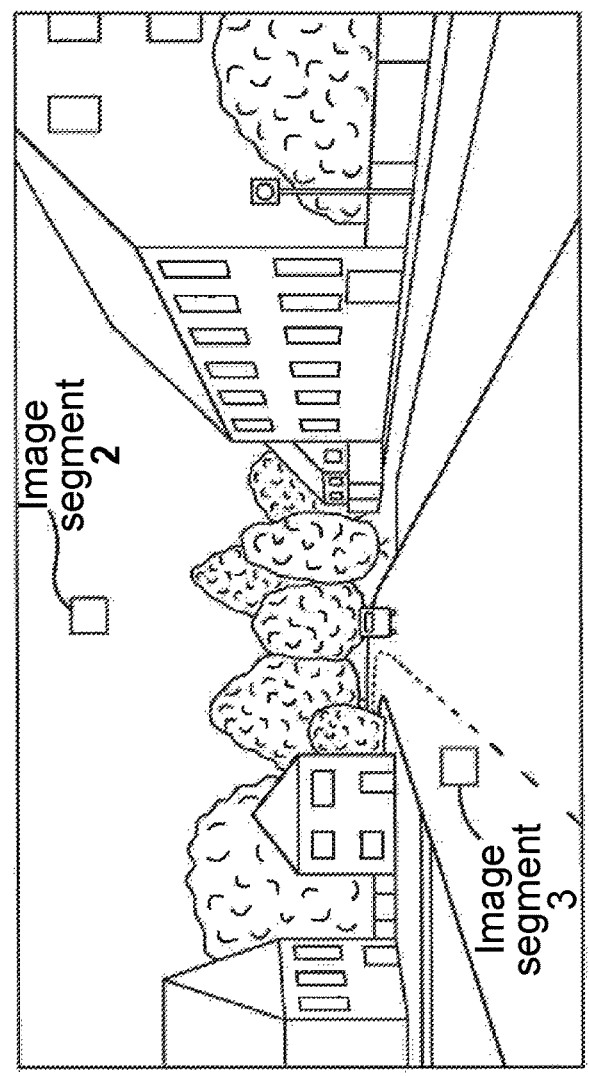
FIG. 1 shows an exemplifying image that has been acquired by an image sensor, according to an example embodiment of the present invention.

FIG. 1 shows an exemplifying image 1 that has been acquired by an image sensor. Each image point of the image corresponds to an individual sensor of a sensor matrix of the image sensor. It is evident that the sky is imaged in an upper region of the exemplifying image 1, and that an asphalt pavement of a road is imaged in a lower region of the exemplifying image 1.

Two exemplifying image segments 2, 3 of image 1 are labeled in FIG. 1. The image sensor acquires image 1 with its active surface. A corresponding image segment 2, 3 of image 1 acquired by the image sensor is thus also pertinent to each region of the image sensor. Image segments 2, 3 thus also delineate two selected regions of the image sensor. A first image segment 2 corresponds to a first selected region of the image sensor, and a second image segment 3 to a second selected region of the image sensor.

Image segment 2 images the sky and thus represents substantially a blue area. Second image segment 3 images the asphalt pavement of the road and thus represents substantially a gray area. A texturing is furthermore present in both image segments 2, 3. The texturing for first image segment 2 results principally from noise of the image sensor, since no actual textures are present in the sky that is imaged. For second image segment 3, the texturing results from the rough surface of the asphalt pavement and additionally from the noise of the image sensor. In particular, a slight motion of the image sensor in combination with the rough surface of the asphalt pavement can cause a noise-like signal to occur in the region of second image segment 3 even in the absence of noise of the image sensor.

The result is that first image segment 2 is not suitable for a correspondence calculation, since the textures occurring in first image segment 2 are caused only by statistical random processes. Second image segment 3, on the other hand, is suitable for a correspondence calculation, since the textures occurring in second image segment 3 represent actual reference points in the environment imaged by the image sensor.

Image segments 2, 3 can be of any size and can thus encompass any number of image points of the image sensor. It will be assumed below by way of example that the selected region of the image sensor encompasses only a single pixel of the image sensor, and that the pertinent image region 2, 3 thus encompasses a single image point.

The noise of the image sensor can be regarded as a random process whose parameters are described statistically.

The noise of an individual pixel or image point of an image sensor can normally be considered independently of the noise of the adjacent pixels. It can furthermore be assumed that (given an identical production process and identical temperature) all the pixels exhibit approximately identical statistical properties. In the typical working range of the image sensor, the noise conforms approximately to a normal distribution. The variance of the noise can be described approximately as $\sigma_g^2(g) = \sigma_0^2 + \alpha g$.

The variance of the noise thus increases with a grayscale value g, linearly with the slope $\alpha$. In darkness (grayscale value g=0), the variance of the noise is equal to $\alpha_0^2$.

For further processing of image signal 10, it can be advantageous to eliminate the dependence of the noise on the grayscale value g.

For that purpose, the original grayscale values g are mapped onto equivalent grayscale values h(g) in accordance with the following function:

$$h(g) = \frac{2\sigma_C}{\sqrt{\alpha}} \sqrt{\sigma_0^2 + ag} + C.$$

The function h(g) is referred to hereinafter as a "tone mapping" function. The expression "tone mapping" is equivalent to the expression "dynamic compression."

Tone mapping is carried out as a pixel-wise operation (i.e., pixel by pixel, mutually independently). After tone mapping, the grayscale dependence of the noise is eliminated. The variance of the noise is then constant and is equal to $\sigma_c^2$.

The two images considered in the context of correspondence calculation generally exhibit a different variance in the noise even after tone mapping.

The tone mapping function is usually more complex than described above, especially when the image sensor is nonlinear (e.g., a high dynamic range (HDR) sensor). The tone mapping function can be variable over time, e.g., can change with each acquired image as a function of the camera parameters. The tone mapping function can be stored in a lookup table or as a calculation rule.

It will be assumed hereinafter that each image point is distorted by additive Gaussian (i.e., normally distributed) noise, and that the distortions of the image points are statistically independent of one another and identically distributed. The standard deviation of this input noise process is referred to as $\sigma_c$. For simplification, it will be assumed that tone mapping has already taken place, so that in the respective image, $\sigma_c$ is constant and independent of the grayscale value g.

This simplification is not absolutely necessary. It is also possible to model and take into consideration a grayscale dependence of the noise for each pixel, but this entails the disadvantage of greater complexity, since the information regarding the variance of the noise present at the respective pixel must be conveyed within the signal processing chain if optimum decision thresholds, which then depend on the grayscale value g of the pixel in question and on the grayscale values of the environment, are to be used.

It will furthermore be assumed that an image signal processing chain is made up at least in part of linear filters, for example a smoothing filter followed by a split into several signal paths; further filters can follow in each signal path, for example smoothing filters, derivation filters, wavelet filters, and combinations thereof.

Figure 2:
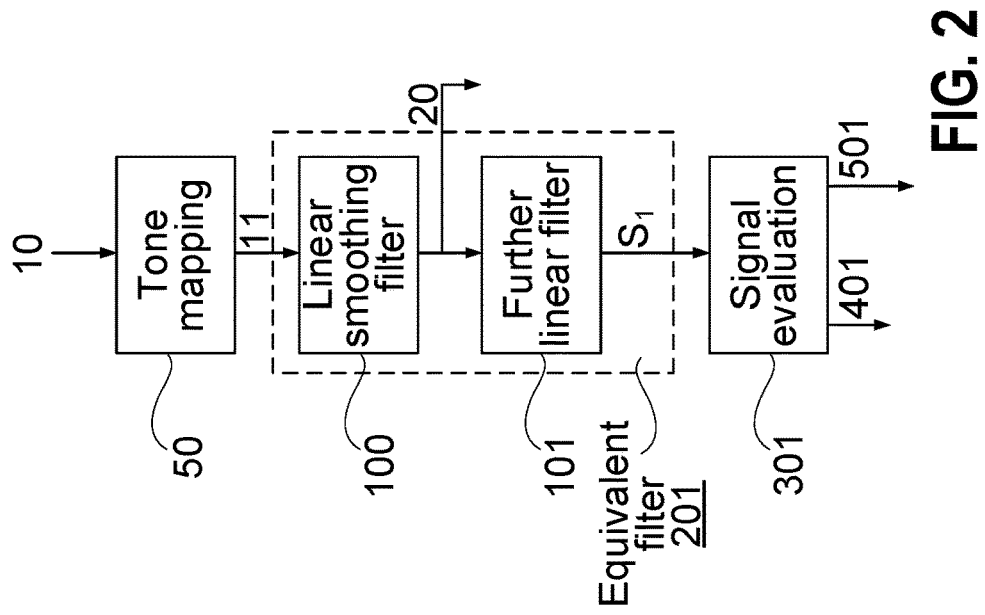
FIG. 2 is a block depiction of a signal processing operation, according to an example embodiment of the present invention.

FIG. 2 shows, for this purpose, an exemplifying portion of a signal processing chain for a first image of the image sensor. The signal processing chain can be embodied repeatedly, for example twice, for a first image and a comparison image. FIG. 2 is a block depiction of a portion of a signal processing operation in accordance with an example embodiment of the invention.

An image signal 10, which constitutes an input signal of a first block 50, is furnished by the image sensor. The first block therefore constitutes an input section that is configured to receive image signal 10 from the image sensor.

First block 50 represents, for example, an optional tone mapping that provides a noise, independent of the grayscale value g, having a standard deviation $\sigma_c$. From first block 50, an adapted image signal 11, i.e., image signal 10 after tone mapping has been applied to image signal 10, is forwarded to a second block 100.

Second block 100 represents, for example, a linear smoothing filter. The adapted image signal is smoothed by the smoothing filter, and a smoothed image signal 20 is thereby generated. The signal path splits after second block 100, and the smoothed image signal 20 is further processed in several parallel signal paths.

A first signal path is depicted in FIG. 2. In addition to first block 50 and second block 100, it also encompasses a third block 101 and a fourth block 301. Third block 101 is, for example, a further linear filter, for example a derivation filter that subtracts two pixel values, from a common environment of image 1, from each other.

It is known that a serial succession of linear filters, for example the filters represented by second block 100 and third block 101, can be regarded as a single linear filter, which will also be referred to hereinafter as an equivalent filter 201. It is thus possible to describe an equivalent filter 201 for each signal path, the number of different equivalent filters 201 to be considered generally being equal to the number of signal paths. An equivalent filter 201 of this kind produces a desired weighted, linear combination of several pixel values (grayscale values), in which context the filter coefficients represent the weights. At the same time, it produces a weighted addition of the independent noise processes. This will be explained using a very simple example, as follows.

Considering, for example, the weighted addition $Y = w_1 X_1 + w_2 X_2$ of the two uncorrelated, identically distributed, zero-mean random variables $X_1$ and $X_2$ having respective weights $w_1$ and $w_2$, what is obtained for the random variable Y is the weighted sum:

$$\begin{aligned} \sigma_Y^2 &= E\{Y^2\} = E\{(w_1 X_1 + w_2 X_2)^2\} \\ &= w_1^2 E\{X_1^2\} + 2 w_1 w_2 E\{X_1 X_2\} + w^2 E\{X_2^2\} \\ &= w_1^2 \sigma_{X_1}^2 + 0 + w_2^2 \sigma_{X_2}^2 \end{aligned}$$

where E{ } denotes an expected value. The middle term disappears because of the lack of correlation. A more generally applicable expression, in accordance with a linear filter $Y = \Sigma_i w_i X_i$ having filter coefficients $w_i$ and $\sigma_{xi} = \sigma_c$, for the variances before and after filtering, is $$\sigma_Y^2 = \sigma_C^2 \sum_i w_i^2$$

and correspondingly, for the standard deviations.

$$\sigma_Y = \sigma_C \sqrt{\sum_i w_i^2}.$$

The factor $\sigma_y/\sigma_c = \sqrt{\Sigma_i w_i^2}$ is therefore a gain factor for the noise. The term "gain" is to be construed here in generalized fashion, since the gain can also have values $\leq 1$. If integral coefficients $w_i$ are preferred, however, the gain is usually >1.

A prerequisite for creating this simple expression is therefore the uncorrelatedness of the noise processes. In practice, this assumption can be made to a very good approximation for image sensors. A prerequisite here is that between the output of the image sensor (or the tone mapping) and equivalent filter 201, no further relevant filtering takes place which might violate the assumption of uncorrelatedness.

If further filters that violate uncorrelatedness are, however, present between the image sensor (or tone mapping) and equivalent filter 201, a simple and practical solution is to model them as linear filters and incorporate them into equivalent filter 201. All further considerations are thus at least approximately valid.

A compression of the information of the first signal path takes place in fourth block 301. In general, nonlinear operations are carried out in this context.

For example, a coarsely quantized representation (i.e., one using a small number of bits) of the input signal of fourth block 301 is generated as an output signal 401. Output signal 401 can represent part of a feature from image 1, or can be further processed in order to be incorporated into the calculation of a feature. Output feature 401 and the further feature calculation will not be discussed further here. Feature calculation occurs in the context of the correspondence calculation that follows signal processing.

Also occurring in fourth block 301 is an evaluation, in terms of noise, of the input signal Si present at that block; this will be referred to hereinafter as an "individual evaluation," and it furnishes a preliminary evaluation parameter 501. What occurs here is an evaluation of image signal 10 in order to determine the extent to which, for a selected region of the image sensor, noise caused by the image sensor is present, image signal 10 prefiltered by equivalent filter 201 being evaluated in that context. Like a resultant evaluation parameter 601 to be described below, preliminary evaluation parameter 501 also describes whether the respective image segment 2, 3 is suitable for a correspondence calculation, in which context image segment 2, 3 corresponds to the selected region of the image sensor, and the evaluation parameter is selected based on the determined extent of the noise. The only basis for preliminary evaluation parameter 501, however, is image signal 10 previously filtered in third block 101. Preliminary evaluation parameter 501 thus, for example, furnishes only a statement regarding a suitability of an image segment 2, 3 for a corresponding calculation for a specific frequency range of image signal 10.

In the simplest case, the ascertaining of preliminary evaluation parameter 501 can involve a case distinction, a check being made as to whether the absolute value of input signal Si for fourth block 301 falls below a threshold $\varepsilon_{1A}$, where the index 1 here respectively denotes the first signal path depicted in FIG. 2. If the value falls below the threshold, a 0 is outputted at the output of fourth block 301; otherwise a 1 is outputted as a preliminary evaluation parameter 501. This embodiment with a binary-value preliminary evaluation parameter 501 represents a preferred embodiment.

The above-described symmetrical threshold-value comparison, with consideration of an absolute value, represents a preferred embodiment that is useful in particular when the sum of the filter weights equals 0, i.e., $0=\Sigma_i w_i$. Also advantageous, and particularly useful when $0 \neq \Sigma_i w_i$, is an asymmetrical threshold-value comparison that checks whether the input signal si is within or outside a range between, for example, $\varepsilon_{1AL}$ and $\varepsilon_{1AR}$ (where $\varepsilon_{1AL} < \varepsilon_{1AR}$).

In the interest of simplicity, however, the examples below refer to the symmetrical threshold-value comparison.

In alternative embodiments, a corresponding comparison of the absolute value of input signal si with three threshold values $\varepsilon_{1A} < \varepsilon_{1B} < \varepsilon_{1C}$ is performed, so that four possible states exist and an individual evaluation having a two-bit word width is outputted at the output of fourth block 301 as preliminary evaluation parameter 501 is.

It is advantageous to select the respective threshold (e.g., $\varepsilon_{1A}$) as a function of the following influencing variables: noise properties of the image sensor; (optionally as a substitute) noise properties of the image signal after tone mapping; noise gain resulting from equivalent filter 201; or application-specific parameters, e.g., a factor $a_A$. It is also advantageous to combine the influencing variables multiplicatively with one another in order thereby to define the threshold.

It will therefore be assumed hereinafter for the example embodiment that the threshold value $\varepsilon_{1A}$ is determined as follows:

$$\varepsilon_{1A} = \alpha_A \cdot \sigma_C \cdot \sqrt{\sum_i w_{1,i}^2}.$$

The corresponding expression also applies to further signal paths p (in this example embodiment p=1 ... 99, the specific value of 99 being immaterial here and having been selected merely by way of example):

$$\varepsilon_{pA} = \alpha_A \cdot \sigma_C \cdot \sqrt{\sum_i w_{p,i}^2}.$$

The index A here denotes a first threshold $\varepsilon_{pA}$ that can be defined using a first application-specific factor $a_A$. Corresponding expressions optionally exist for further thresholds, e.g., index B for a threshold $\varepsilon_{pB}$ and factor $a_B$, and so on.

Figure 3:
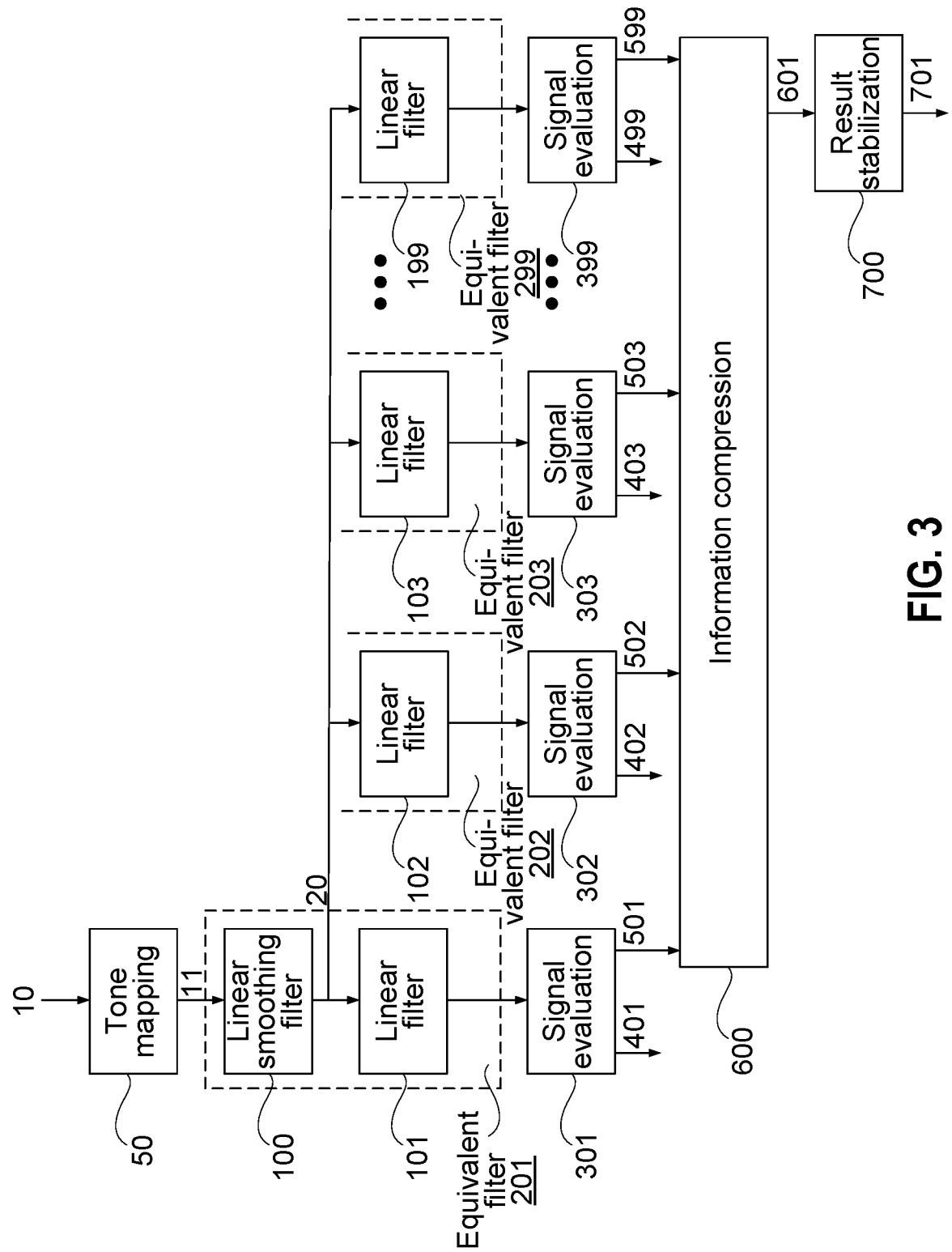
FIG. 3 is an expanded block depiction of a signal processing operation, according to an example embodiment of the present invention.

FIG. 3 shows a larger portion of the signal processing chain illustrated in FIG. 2. It depicts, in addition to the signal path described in FIG. 2 (also referred to as the "first signal path"), the further signal paths. In each of the signal paths, a proportional extent of the noise is determined for the selected region of the image sensor. The proportional extent of the noise can correspond to that extent of the noise for the selected region of the image sensor which is caused by the image sensor. The proportional extent of the noise can also, however, be limited to specific properties of image signal 10, in particular to a frequency range.

A number p of signal paths is depicted. A p-th signal path, where p∈{1, ... , 99}, contains a linear filter 102, 103, ... , 199 (i.e., labeled here with the reference character 100+p) that corresponds to third block 101. Linear filters 102, 103, ... , 199 have different filter properties in order to determine the proportional extents of the noise which are pertinent to the signal paths. A merging of the respective linear filter 102, 103, ... , 199 of a signal path with the upstream linear filter of second block 100 is referred to as the equivalent filter 201, 202, ... , 299 pertinent to the respective signal path (reference character 200+p). Advantageously, linear filters 101, 102, ... , 199 are all different from one another.

Equivalent filters 201, 202, ... , 299 are correspondingly also different. In particular, by way of a corresponding selection of linear filters 101, 102, ... , 199 the several pertinent proportions of the extent of the noise are thus each pertinent to different frequency ranges of image signal 10.

A p-th signal path, where p∈{1, ... , 99}, furthermore respectively contains a block 301, 302, 303, ... , 399 that corresponds to fourth block 301 of the first signal path. Equivalent filters 201, 202, ... , 299, together with blocks 301, 302, 303, ... , 399 and an optional combination block 600, constitute an evaluation section. This is configured to evaluate image signal 10 in order to determine the extent to which, for a selected region of the image sensor, noise caused by the image sensor is present; and to ascertain a resultant evaluation parameter 601 for image segment 2, 3 of the image acquired by the image sensor which describes whether image segment 2, 3 is suitable for a correspondence calculation; image segment 2, 3 corresponding to the selected region of the image sensor, and resultant evaluation parameter 601 being ascertained based on the determined extent of the noise.

Signals $s_p$, where p∈{1, ... , 99}, are present at the inputs of blocks 301, 302, 303, ... , 399. As described earlier, an individual evaluation of an input signal takes place respectively in these blocks 301, 302, 303, ... , 399 and also in fourth block 301, one or several threshold-value comparisons for the absolute value $|s_p|$ of the respective input signal $s_p$ being carried out in each case.

The results of these comparisons are furnished as preliminary evaluation parameters 501, 502, 503, . . . , 599 and forwarded to an optional combination block 600.

A purpose of combination block 600 is information compression. This compression is characterized in that an output signal of combination block 600 can be described with fewer bits than the totality of the input signals, i.e., of preliminary evaluation parameters 501, 502, 503, . . . , 599. The output signal then generally has a lower entropy. An information loss occurs but is deliberately accepted, for example in order to achieve the advantage of a smaller word width and to reduce transfer bandwidth. The output signal of combination block 600 is resultant evaluation parameter 601. Combination block 600 thus merges preliminary evaluation parameters 501, 502, 503, . . . , 599 in order to yield resultant evaluation parameter 601.

Figure 4:
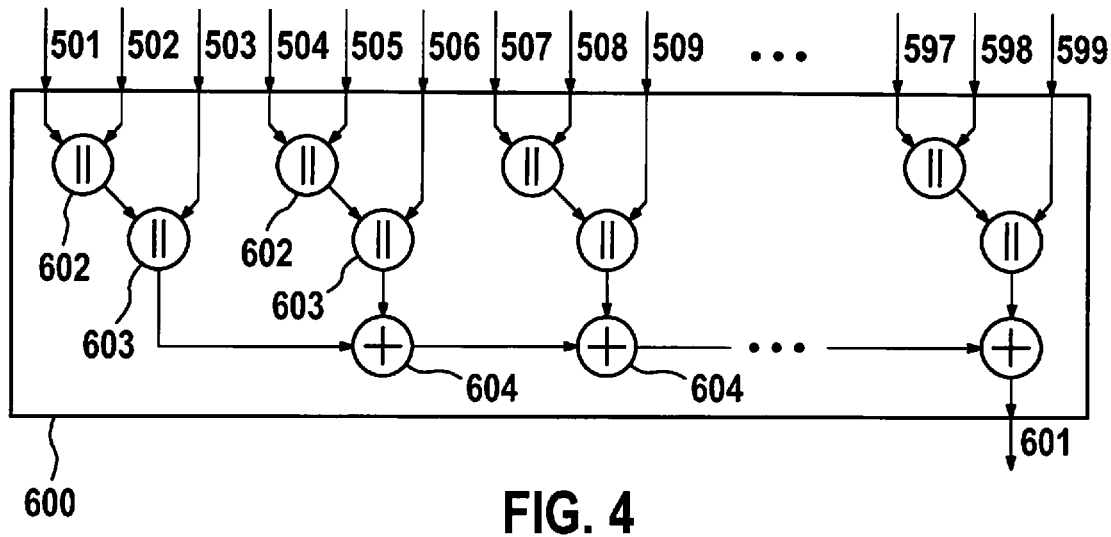
FIG. 4 shows a first logic circuit for merging several preliminary evaluation parameters to yield a resultant evaluation parameter, according to an example embodiment of the present invention.
Figure 5:
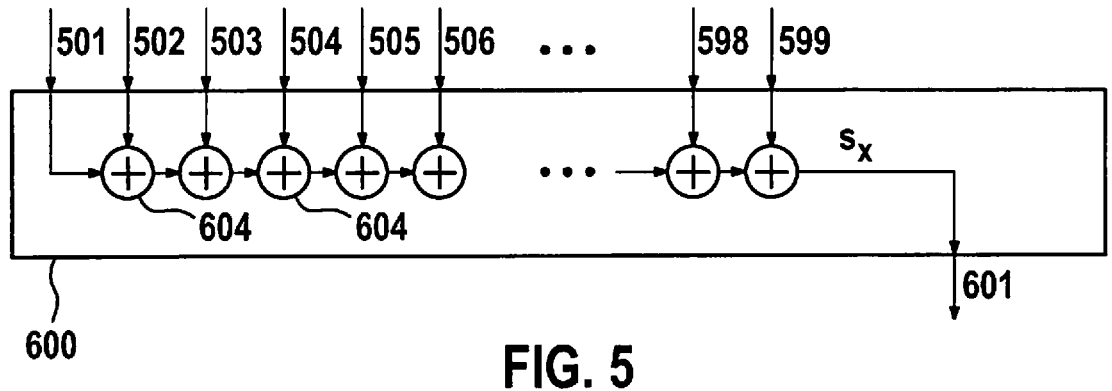
FIG. 5 shows a second logic circuit for merging several preliminary evaluation parameters to yield a resultant evaluation parameter, according to an example embodiment of the present invention.
Figure 6:
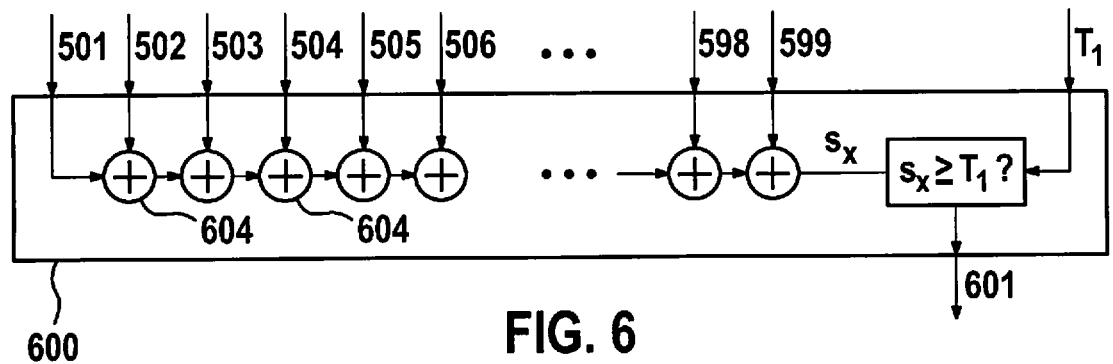
FIG. 6 shows a third logic circuit for merging several preliminary evaluation parameters to yield a resultant evaluation parameter, according to an example embodiment of the present invention.

FIGS. 4-6 show various constructions of block 600. FIG. 4 shows a first logic circuit for merging several preliminary evaluation parameters 501, 502, 503, . . . , 599 to yield a resultant evaluation parameter 601, which circuit, in an example embodiment of the invention, is combination block 600. Preliminary evaluation parameters 501, 502, 503, . . . , 599 are assumed in this context to be binary-value input signals. Each three of preliminary evaluation parameters 501, 502, 503, . . . , 599 form a group, and are logically combined by way of two OR gates 602, 603. This means that on an output side of OR gates 602, 603, a logical "1" is outputted as an intermediate result for the respective group if at least one of preliminary evaluation parameters 501, 502, 503, . . . , 599 of that group has assumed a logical "1" as a value. The binary intermediate results of all the groups are coupled via a plurality of adders 604, and are thus added. Assuming 99 signal paths and 33 groups of three, the output signal of combination block 600 thus has a value range from 0 to 33. This corresponds to an entropy of less than 6 bits, while a total of 99 bits are to be transferred for preliminary evaluation parameters 501, 502, 503, . . . , 599. A first information compression is thus achieved in this manner. The added intermediate results are referred to as a "sum signal" $s_x$, and are furnished as resultant evaluation parameter 601 at an output of combination block 600. Resultant evaluation parameter 601 thus has a value range that, by way of the individual values, describes in several steps a degree that describes a suitability of the respectively considered image segment 2, 3 for correspondence calculation.

FIG. 5 shows a second logic circuit for merging several preliminary evaluation parameters 501, 502, 503, . . . , 599 to yield a resultant evaluation parameter 601, which circuit, in an example embodiment of the invention, is combination block 600. FIG. 5 shows an information compression capability that is simplified with respect to the logic circuit shown in FIG. 4, namely by simple addition of preliminary evaluation parameters 501, 502, 503, . . . , 599, which need not have binary values but can also cover wider value ranges. For that purpose, all the inputs of combination block 600 at which preliminary evaluation parameters 501, 502, 503, . . . , 599 are furnished to combination block 600 are coupled via a plurality of adders 604, so that all the preliminary evaluation parameters 501, 502, 503, . . . , 599 are added up.

The added preliminary evaluation parameters 501, 502, 503, . . . , 599 are referred to as a sum signal $s_x$ and are furnished as resultant evaluation parameter 601 at an output of combination block 600.

FIG. 6 shows a third logic circuit for merging several preliminary evaluation parameters 501, 502, 503, . . . , 599 to yield a resultant evaluation parameter 601, which circuit, in an example embodiment of the invention, is combination block 600. Combination block 600 shown in FIG. 6 is constructed similarly to combination block 600 known from FIG. 5, except that sum signal $s_x$, before being furnished at the output of the combination block, is compared with a threshold value $T_1$ and the result of that comparison is outputted as a binary information item. Resultant evaluation parameter 601 is thus a binary value.

As shown in FIG. 3, a preliminary evaluation parameter 501, 502, 503, . . . , 599 is thus ascertained by each of the p signal paths, each of the preliminary evaluation parameters 501, 502, 503, . . . , 599 being based on a proportional extent of the noise, the proportional extent of the noise being dependent on equivalent filters 201, 202, 203, . . . , 299 applied in each signal path. Preliminary evaluation parameters 501, 502, 503, . . . , 599 are merged by combination block 600 to yield resultant evaluation parameter 601. Because each of preliminary evaluation parameters 501, 502, 503, . . . , 599 is based on a different proportional extent of the noise, resultant evaluation parameter 601 is thus determined for the relevant image segment 2, 3 based on a noise that results from a combination of individual portions of the noise, in this case the proportional extents of the noise.

A plurality of further possibilities exist for configuring combination block 600 to suitably combine preliminary evaluation parameters 501, 502, 503, . . . , 599 with one another, for example using logical operations (AND, OR, XOR, NOT, etc.), calculation operations (addition, multiplication, etc.), threshold value comparisons, quantization, lookup tables, and so forth. These operations can be linked either by being "designed" or by "training" based on training data.

What is significant in this context is that the individual evaluations, and thus preliminary evaluation parameters 501, 502, 503, . . . , 599, are linked into a compressed evaluation, so that the compressed evaluation already provides relatively reliable information as to whether, and if applicable to what extent, the signal that has just been processed, which is furnished as output signal 401, 402, 403, . . . , 499, stands out from the noise. This compressed evaluation can involve binary values or can have a wider value range.

This compressed evaluation can also be a vector value. In this case what is outputted is therefore not only a binary or "polyvalent" information item but several such items, which can be construed as a vector when considered together. For instance, the examples proposed in FIGS. 4 and 5 for merging individual evaluations can be viewed, not only as alternatives, but also in combination, where both are implemented together in combination block 600, so that the result of combination block 600, and thus resultant evaluation parameter 601, is a two-dimensional vector.

A stabilization function is applied to the output signal of combination block 600 and thus to resultant evaluation parameter 601. This is depicted in FIG. 3 by way of a stabilization block 700. The optional stabilization block 700 uses positional and/or time-related statistical correlations to stabilize the result, for example by the fact that the intermediate results of combination block 600 depicted in FIG. 5, which have a value range from 0 to 99, are summed with weighting in a positional/time-related pixel vicinity relationship and compared with a threshold.

The motivation for this is that a decision that is more stable in terms of position and/or time can be arrived at if the decisions are made not individually (pixel by pixel) but in a positional and/or time-related context.

Figure 7:
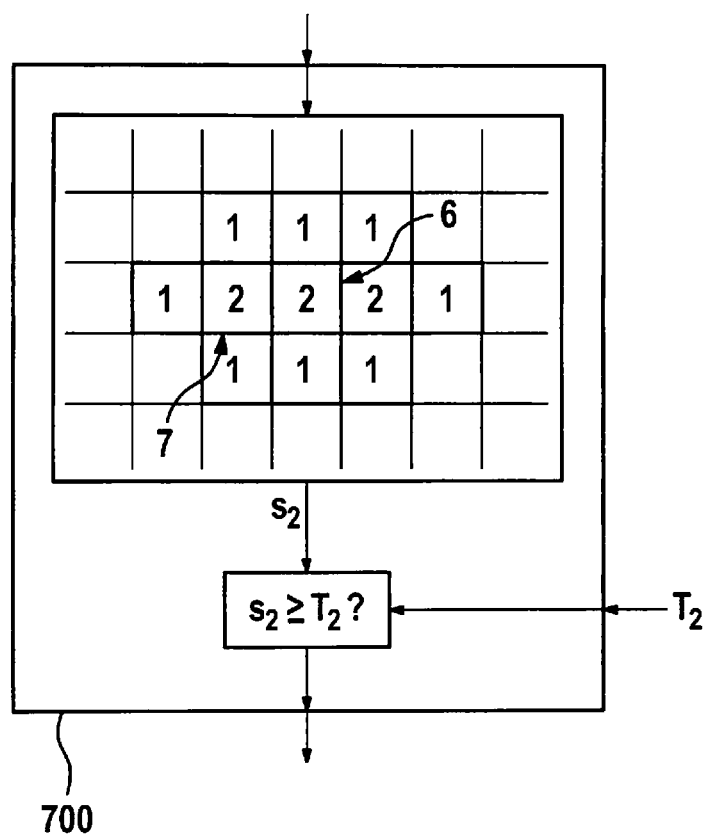
FIG. 7 schematically depicts a stabilization function, according to an example embodiment of the present invention.

An example of weighted summation in a positional pixel vicinity relationship is depicted in FIG. 7.

In order to determine an extent of a noise, image signal 10 is evaluated here for several selected image segments 2, 3 of the image sensor in order to ascertain several resultant evaluation parameters 601. The signal processing depicted in FIG. 3 is thus performed in particular for each pixel, i.e., for each image point, or for each feature in the image. If the signal processing is performed for each pixel of the image sensor, the result is that a resultant evaluation parameter 601 is ascertained for each pixel.

In the signal processing section represented by stabilization block 700, a stabilization function is applied to resultant evaluation parameter 601 which is pertinent, for example, to first image segment 2, an adaptation of a value of resultant evaluation parameter 601 of first image segment 2 to a resultant evaluation parameter of an image segment 4 adjacent to first image segment 2 being performed.

For this, all the resultant evaluation parameters 601 that have been ascertained are buffered at least briefly so that for each pixel, and thus for each image segment 2, 3, the respective resultant evaluation parameters of the adjacent pixels can be accessed.

Here, for example, for reference pixel 6 depicted with crosshatching in FIG. 7, resultant evaluation parameters 601 of ten adjacent pixels are accessed, and a weighted summation of resultant evaluation parameters 601 is carried out over all eleven pixels; in this case this has a smoothing effect (smoothing filter), the weights here being equal to 1 or 2. Because the sum of the weights is equal to 14 in this case, the result has a value range from (0) to (14*99=1386). Reference pixel 6 thus corresponds, for example, to that pixel of the image sensor by which first image segment 2 is acquired. Adjacent pixel 7 located to the left of reference pixel 6 corresponds to a pixel of the image sensor by which an image segment 4 adjacent to first image segment 2 is acquired.

Resultant evaluation parameter 601 that has thereby been stabilized is outputted as an output value Ω and can optionally be compared with a threshold $T_2$ that, for instance, has a value of 700. As an alternative to this threshold value decision, a quantization operation can also take place, for instance mapping the 0-1386 value range onto a smaller value range of, for example, 0-7.

All the numbers recited are to be regarded merely as examples. The smoothing filter furnished by stabilization block 700 is not obligatorily of symmetrical construction, and also does not need to be densely populated. Any shapes and sizes can prove advantageous and can be ascertained, for example, by experiment.

Positional weighted summation generally requires intermediate buffering of resultant evaluation parameters 601, and generally also results in a delay, since the final result for the respective (reference) pixel is not calculated until all further intermediate results are available.

Weighted summation can also, additionally or alternatively, be carried out in a time direction. For this, for example, intermediately buffered intermediate results from an earlier calculation (e.g., for the preceding image) are included. This inclusion can be accomplished by utilizing motion compensation, for example to compensate for rotation of a camera that encompasses the image sensor.

The result of stabilization block 700 is a decision (in the case of a binary result) or an evaluation (in the case of a more-than-binary result) regarding the noise at the respective pixel. The binary values can be interpreted as described below. Stabilized resultant evaluation parameter 701 is furnished at the output of stabilization block 700. Stabilization block 700 is optional. The meanings described below of the values of the stabilized resultant evaluation parameter 601 can be applied in similar fashion directly to the (non-stabilized) resultant evaluation parameter 601.

If stabilized resultant evaluation parameter 701 or resultant evaluation parameter 601 is a binary value, it can be interpreted as follows:

Value=0 means: the feature vector determined for this pixel is probably significantly influenced by noise and should therefore not be used for correspondence calculation (or other further processing).

Value=1 means: the feature vector is probably not influenced by noise and can therefore be used for correspondence calculation, etc.

If stabilized resultant evaluation parameter 701 or resultant evaluation parameter 601 is quantized to four values, the interpretation can be:

Value=0 means: the feature vector is probably influenced by noise and is therefore not used for correspondence calculation.

Value=1 means: the feature vector can be influenced by noise. Not much confidence should therefore be placed in results obtained with or for this feature vector.

Value=2 means: the feature vector is probably not influenced by noise and can therefore normally be used for correspondence calculation.

Value=3 means: the feature vector is not influenced by noise. It is so clearly above the noise level that particular confidence can be placed in the corresponding results.

The selected sequence of combination block 600 and stabilization block 700 is to be understood here as merely an example. It can also be reversed in order firstly to incorporate the positional/time-related vicinity and then achieve information compression. The functions of these blocks 600, 700 can also be interwoven with one another and implemented in one common block.

In summary, the method according to the present invention makes it possible to provide a further information item regarding a feature, which item expresses more or less confidence in that feature depending on the "noise separation"; this indication of confidence or quality can be described very compactly (e.g., with one bit or a few bits) and can be passed on to downstream algorithms or efficiently stored for further use.

In a preferred example embodiment, the information item according to the present invention is ascertained and appended for each pixel or for each feature. It is also possible, however, to ascertain and furnish it less frequently, for example for a respective group of pixels or features, or as a binary image that can then be encoded and decoded using known data compression methods. In this case a representation using less than one bit per pixel, or per feature, is also possible.

What is claimed is:

1. A method comprising:
   receiving an image signal from an image sensor;
   determining, based on the image signal, an extent to which, for a selected region of the image sensor, noise caused by the image sensor is present; and
   ascertaining a resultant evaluation parameter for an image segment of an image acquired by the image sensor, wherein:
   the resultant evaluation parameter represents whether the image segment is suitable for a correspondence calculation; and the image segment corresponding to the selected region of the image sensor and the resultant evaluation parameter are ascertained based on the determined extent of the noise, wherein the determining includes, for the selected region of the image sensor, determining a respective proportional extent of the noise in each of different signal paths such that the image signal is filtered differently in each of the different signal paths, and the ascertaining is based on the respective proportional extents of the noise from all of the different signal paths.

2. A method of comprising:

receiving an image signal from an image sensor;

determining, based on the image signal, an extent to which, for a selected region of the image sensor, noise caused by the image sensor is present; and ascertaining a resultant evaluation parameter for an image segment of an image acquired by the image sensor, wherein:

the resultant evaluation parameter represents whether the image segment is suitable for a correspondence calculation; and the image segment corresponding to the selected region of the image sensor and the resultant evaluation parameter are ascertained based on the determined extent of the noise, wherein:

the determining includes, for the selected region of the image sensor, determining a respective proportional extent of the noise in each of different signal paths; and the ascertaining is based on the respective proportional extents of the noise from all of the different signal paths.

3. The method of claim 2, wherein different frequency regions of the image signal are respectively pertinent to each of the proportional extents of the noise.

4. The method of claim 2, further comprising ascertaining a respective preliminary evaluation parameter from each proportional extents of the noise, wherein the ascertaining of the resultant evaluation parameter is performed by merging the preliminary evaluation parameters.

5. The method of claim 1, further comprising applying a dynamic compression to the image signal, wherein the determining is subsequently performed based on the dynamically compressed image signal.

6. The method of claim 1, wherein the resultant evaluation parameter is a binary value.

7. The method of claim 1, wherein the resultant evaluation parameter indicates a degree of suitability for the correspondence calculation in each of several steps.

8. The method of claim 1, wherein the resultant evaluation parameter is a vector value.

9. The method of claim 1, wherein the determining is additionally performed respectively for one or more other selected regions of the image sensor in order to ascertain one or more additional resultant evaluation parameters.

10. The method of claim 9, further comprising:

applying a stabilization function to one of the resultant evaluation parameters; and performing a positional and/or time-related filtering based on adjacent ones of the resultant evaluation parameters.

11. An apparatus comprising a processor, wherein:

the processor is configured to:
  receive an image signal from an image sensor;
  determine, based on the image signal, an extent to which, for a selected region of the image sensor, noise caused by the image sensor is present; and
  ascertain a resultant evaluation parameter for an image segment of an image acquired by the image sensor;

the resultant evaluation parameter represents whether the image segment is suitable for a correspondence calculation; and the image segment corresponding to the selected region of the image sensor and the resultant evaluation parameter are ascertained based on the determined extent of the noise, wherein the determining includes, for the selected region of the image sensor, determining a respective proportional extent of the noise in each of different signal paths such that the image signal is filtered differently in each of the different signal paths, and the ascertaining is based on the respective proportional extents of the noise from all of the different signal paths.

* * * * *